Figure 1:
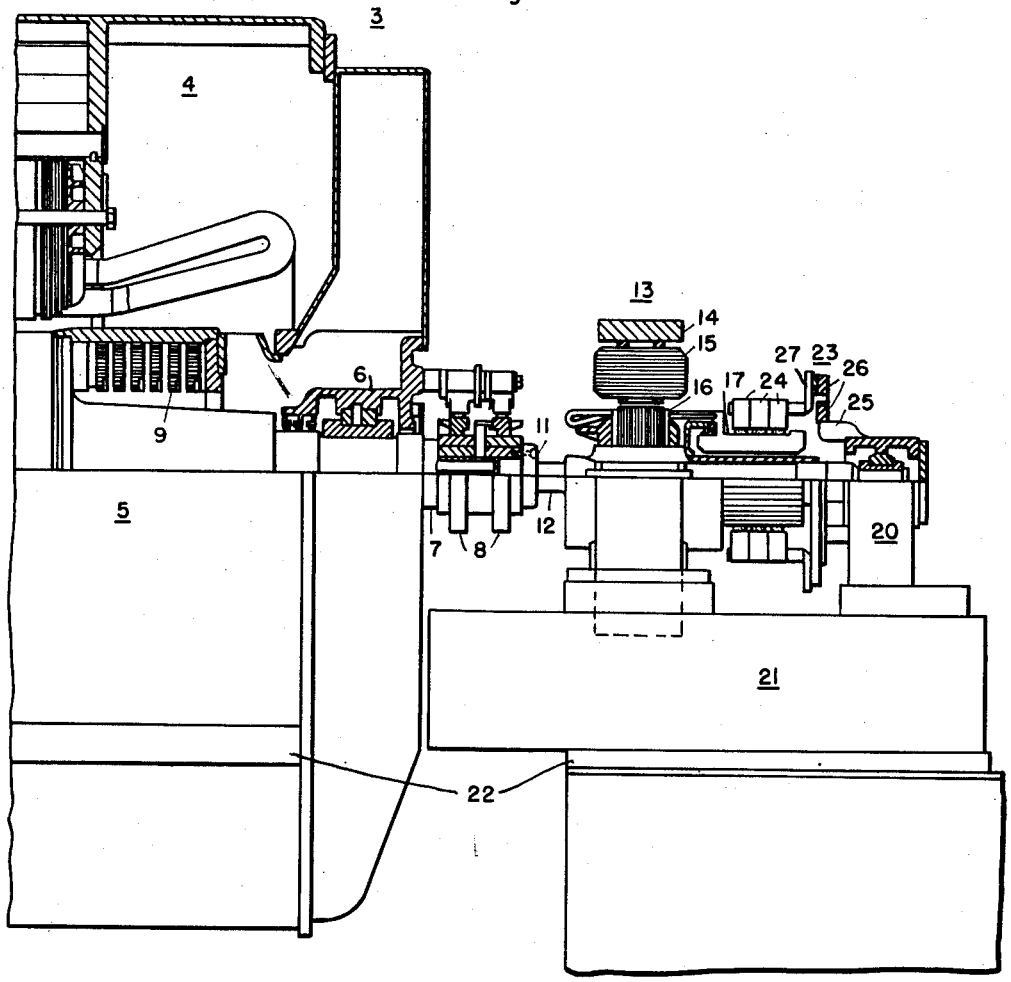

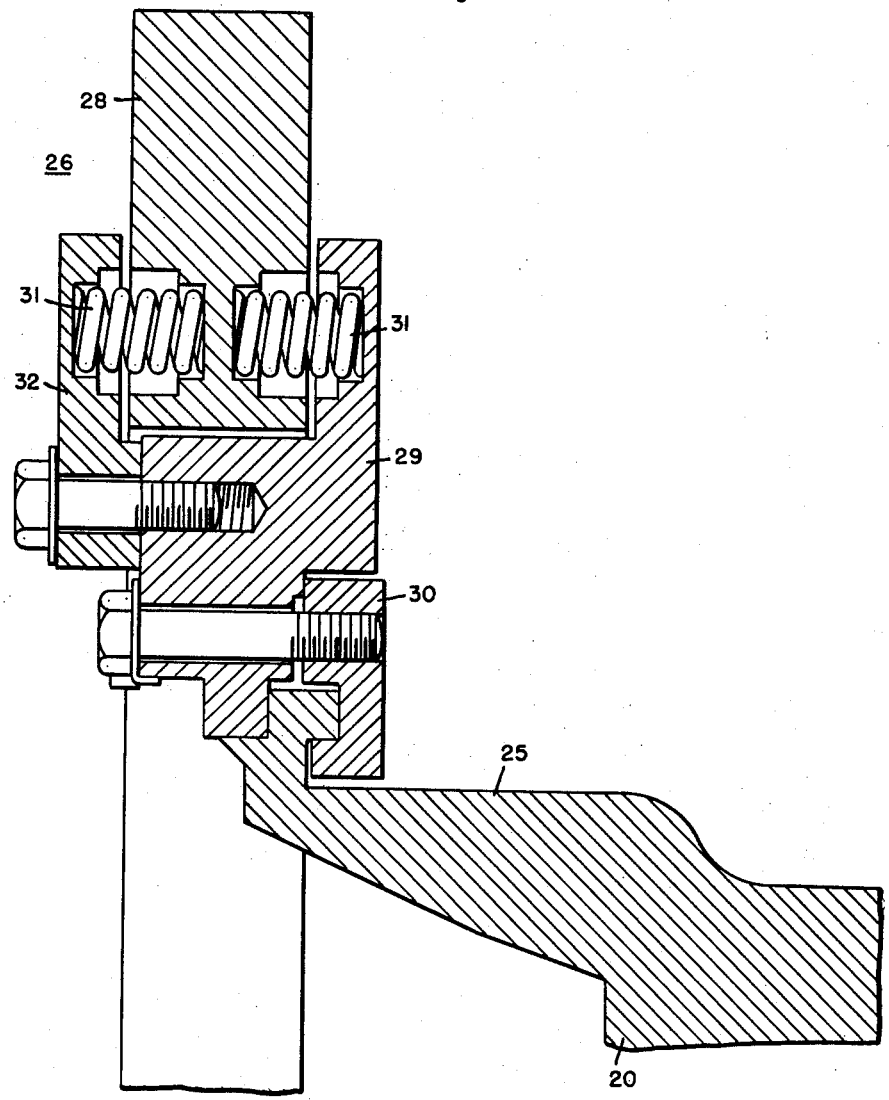

Patented May 25, 1954

2,679,606

UNITED STATES PATENT OFFICE 2,679,606

FLEXIBLE BRUSH-RIGGING MOUNTING FOR EXCITERS

René A. Baudry and Bernard B. Winer, Pittsburgh, Pa., assignors to Westinghouse Electric Corporation, East Pittsburgh, Pa., a corporation of Pennsylvania Application July 26, 1952, Serial No. 301,072

4 Claims. (Cl. 310—112)

Our invention relates to means for preventing excessive vibration of the brush-rigging of an industrial-size turbine generator, which may have a rating in the range between 1000 and 7500 kilowatts, or any similar synchronous machine. This synchronous machine is a two-pole machine, operating at 3600 revolutions per minute (on a 60-cycle system), and it is excited by a direct-connected exciter, which is a relatively small direct-current generator having a commutator and a brush-rigging for supporting the brushes for engaging the commutator. The relatively large synchronous machine transmits normal frequency vibrations and double-frequency vibrations to the common bedplate or foundation, and these vibrations are transmitted to the brush-rigging, resulting occasionally in excessive brush-wear, and violent vibration detrimental to the brush-rigging.

Heretofore, no practical way has been found for reducing these brush-rigging vibrations, other than making the brush-rigging mounting as solid as it was feasible to make it. These brush-rigging vibrations have heretofore been tolerated, because the brush rigging must necessarily have a very considerable stiffness, from the standpoint of its alignment with the exciter-shaft, and also because the synchronous-machine vibrations come into the exciter brush-rigging in many different and unpredictable directions, so that the brush vibrations may be translational or oscillatory, in any one or all three of the Cartesian axes.

In accordance with our present invention, we provide a special spring-mounting for the brush-rigging of such an assembly, with such spring-stiffness as to give the brush-rigging a critical vibration-rate, for translational and oscillatory vibrations in all three Cartesian axes, at a fraction of the frequency of the synchronous machine, so that the brush-rigging support provides a substantially rigid restraint against movements having a frequency one half of said critical rate, or less, while being resilient with respect to all vibrations at the frequency of the synchronous machine, and at twice that frequency. In this way, the brush rigging is substantially stiffly mounted, with respect to maintaining its necessary alignment, but it is so resiliently mounted, with respect to the disturbing vibrations, that the brush-rigging remains practically vibration-free, independent of the exciter-bedplate vibration.

With the foregoing and other objects in view, our invention consists in the mechanisms, structures, combinations, parts, and methods of design and assembly, hereinafter described, and illustrated in the accompanying drawing, wherein:

Figure 1 is a simplified side elevation of an assembly to which our invention is particularly applicable, the upper half being shown in longitudinal section; and Fig. 2 is a detail of the rocker-ring mounting, being a cross section through one of the bracket-arms which support the rocker-ring of the brush-rigging.

Fig. 1 shows one small corner of a turbine generator 3, which may be regarded as representative of any synchronous two-pole dynamo-electric machine, having a stator member 4 and a rotor member 5. The illustrated end of this machine is shown as having a bearing 6, beyond which extends a short shaft-end 7 carrying two slip-rings 8 for exciting the rotating field-winding 9 of the synchronous machine.

Bolted onto the end of the shaft-end 7, as shown at 11, is the shaft 12 of an exciter 13, which is smaller machine than the generator 3. The exciter is a direct-current generator, having a stator member 14 which carries the field-windings 15, and a rotor member 16 which is the armature member of the machine. In the illustrated form of embodiment of our invention, the rotor member 16 of the exciter 13 is provided with a commutator cylinder 17, which is illustrated as being disposed in its usual position, namely at the side which is away from the synchronous generator 3.

The rotor-shaft 12 of the exciter 13 has a portion extending beyond the end of the commutator cylinder 17, and it is there illustrated as being supported by a pedestal-type bearing 20, in accordance with a common practice. The exciter-stator or frame 14 and the pedestal-bearing 20 are mounted on an exciter bedplate 21, which is in turn mounted on the same foundation or seating-plate 22 which also supports the relatively large synchronous generator 3.

The exciter 13 is necessarily provided with a brush-rigging 23, which carries the brushes 24 which engage the commutator-cylinder 17, and this brush-rigging must be stationarily supported. The usual brush-rigging supporting-means, in this type of machine, is carried by the pedestal-bearing 20, rather than by the exciter-frame 14. We have accordingly illustrated our brush-rigging 23 as being carried by a plurality of bracket-arms 25 which extend out from the pedestal-bearing 20. These bracket-arms 25 support a rocker-ring 26, which in turn supports the brush-holder brackets 27 of the brush-rigging 23.

In accordance with our invention, as shown in detail in Fig. 2, the rocker-ring 26 is shown as being divided into two parts, namely an outer ring 28 and a concentric inner ring 29. It is the outer ring 28 which carries the brush-holder brackets 27 which are shown in Fig. 1. The inner ring 29 is fastened rigidly to the bracket-arms 25 of the pedestal 20, by suitable clamps 30, as is known in the art. The outer ring 28 is flexibly or resiliently mounted on the inner ring 29, as by means of coil springs 31 and clamps 32.

Our flexible brush-rigging mounting differs from most flexible mountings, because it is designed to be flexible only at the high frequencies of the exciting forces which tend to shake the brush-rigging, these exciting forces being vibrations at the frequency of the synchronous machine 3, and at twice that frequency. If the synchronous machine is a 60-cycle machine, for example, the brush-rigging-disturbing vibrations are at 60 and 120 cycles per second, or 3600 and 7200 vibrations per minute. These high frequencies of the exciting forces permit the use of a flexible mounting which has considerable stiffness from an alignment-standpoint, yet which effectively prevents the transmission of the high-frequency vibration of the brush-rigging 23.

It should be noted that the brush-rigging 23 is subject to all kinds of vibration, including both translational and oscillatory vibrations in all three Cartesian axes. The brush-rigging must be flexibly mounted in all planes, therefore, in order to prevent or decrease the transmission of vibratory forces, no matter what their direction. This is accomplished by using springs 31 whose axial spring-constants are approximately the same as their lateral spring-constants. Our brush-rigging supporting-springs 31 are stiff enough to give the brush-rigging a critical vibration-rate at something like 30%, or other fraction, of the 60-cycle frequency of the synchronous machine, for all kinds or modes of vibrations to which the brush-rigging is subjected.

In this manner, the brush-rigging support provides a substantially rigid restraint against movements which are slower than said critical rate, so that the brush-rigging is held rigidly (not resiliently) in alignment with the axis of the commutator cylinder 17, and so that the brushes 24 do not chatter on the commutator cylinder, and do not become displaced angularly or circumferentially out of their correct brush-positions on the commutator.

With respect to the high-frequency vibrations which are to be suppressed, however, it will be noted that these vibrations are at a rate which is considerably higher than the critical vibration-rate of the brush-rigging spring-assembly, so that our resilient brush-rigging support is flexible or resilient with respect to these high-frequency vibrations which tend to cause severe vibration of the brush-rigging, and which tend to cause very excessive brush-wear. For example, the pedestal 20 may frequently have vibrations of the order of 3 or 4 mils in amplitude, and if it were not for our resilient mounting, the portions of the brush-rigging 22 which are furthest away from said pedestal might well have vibrations of the order of 10 mils in amplitude. With our new brush-rigging support, the brush-rigging is practically vibration-free, even when the exciter-bedplate 21 and the pedestal 20 are vibrating violently.

It will be understood, of course, that we are not limited to the use of helical or coil-springs 31, as other elastic members having the correct spring-constant would serve the same purpose. These and other changes could obviously be made, without departing from the essential spirit and intent of our invention.

We claim as our invention:

1. In combination, a relatively large synchronous two-pole dynamo-electric machine having a stator member and a rotor member, a relatively small exciter-machine therefor, having a stator member and a rotor member, the rotor shafts of the two machines being extensions of each other, the exciter-rotor including a commutator cylinder, a brush-rigging for supporting the brushes for engaging the commutator-cylinder, and a resilient means for stiffly supporting the brush-rigging in its cooperative position with respect to the commutator-cylinder, with such spring-stiffness as to give the brush-rigging a critical vibration-rate, for translational and oscillatory vibrations in all three Cartesian axes, at a frequency which is considerably lower than the frequency of the synchronous machine, whereby the brush-rigging support provides a substantially rigid restraint against movements slower than said critical rate, while being resilient with respect to all vibrations at the frequency of the synchronous machine and at twice that frequency.

2. The invention as defined in claim 1, characterized by each machine having its own separate shaft, and a detachable shaft-coupling between the two shafts.

3. In combination, a relatively large synchronous two-pole dynamo-electric machine having a stator member and a rotor member, a relatively small exciter-machine therefor, having a stator member and a rotor member, the rotor shafts of the two machines being extensions of each other, the exciter-rotor including a commutator cylinder, a pedestal-bearing for supporting the exciter-shaft beyond the end of the commutator-cylinder, a brush-rigging for supporting the brushes for engaging the commutator-cylinder, and a resilient means for stiffly supporting the brush-rigging from the bearing-pedestal with such spring-stiffness as to give the brush-rigging a critical vibration-rate, for translational and oscillatory vibrations in all three Cartesian axes, at a frequency which is considerably lower than the frequency of the synchronous machine, whereby the brush-rigging support provides a substantially rigid restraint against movements slower than said critical rate, while being resilient with respect to all vibrations at the frequency of the synchronous machine and at twice that frequency.

4. The invention as defined in claim 3, characterized by each machine having its own separate shaft, and a detachable shaft-coupling between the two shafts.

References Cited in the file of this patent

UNITED STATES PATENTS

| Number | Name | Date |
|---|---|---|
| 1,654,305 | Nottage | Dec. 27, 1927 |